United States Patent
Soubirane et al.

(10) Patent No.: US 12,322,260 B2
(45) Date of Patent: Jun. 3, 2025

(54) PAYMENT DEVICE INTEGRATED INTO AN UNATTENDED ELECTRONIC PAYMENT TERMINAL

(71) Applicant: BANKS AND ACQUIRERS INTERNATIONAL HOLDING, Paris (FR)

(72) Inventors: Alain Soubirane, Bourg-les-Valence (FR); Franck Robert, Suresnes (FR); Olivier Soleilhavoup, Lyons (FR); Mampionona Rakotobe, Valence (FR); Andres Bohorquez Prieto, Lyons (FR); Maxime Goulon, Chatuzange-le-Goubet (FR); Fabien Demange, Saint-Peray (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 0 days.

(21) Appl. No.: 18/550,162

(22) PCT Filed: Mar. 15, 2022

(86) PCT No.: PCT/EP2022/056744
§ 371 (c)(1),
(2) Date: Sep. 12, 2023

(87) PCT Pub. No.: WO2022/194889
PCT Pub. Date: Sep. 22, 2022

(65) Prior Publication Data
US 2024/0071163 A1    Feb. 29, 2024

(30) Foreign Application Priority Data
Mar. 16, 2021    (FR) ..................... 2102627

(51) Int. Cl.
*G07F 7/08*    (2006.01)

(52) U.S. Cl.
CPC ............ *G07F 7/0893* (2013.01); *G07F 7/088* (2013.01)

(58) Field of Classification Search
CPC .... G07F 7/0893; G07F 7/088; G07F 19/2055; H04B 5/77
See application file for complete search history.

(56) References Cited

U.S. PATENT DOCUMENTS

| | | | | |
|---|---|---|---|---|
| 5,465,832 A | * | 11/1995 | Kennedy | .................. G09B 5/02 206/45.23 |
| 11,238,434 B2 | | 2/2022 | Rotsaert | |

(Continued)

FOREIGN PATENT DOCUMENTS

| | | | |
|---|---|---|---|
| JP | 2004078533 A | * | 3/2004 |
| JP | 2011030299 A | * | 2/2011 |

(Continued)

OTHER PUBLICATIONS

JP 2004078533A Antenna Structure of Portable Reader, 7 pages. (Year: 2024).*

(Continued)

*Primary Examiner* — Tuyen K Vo
(74) *Attorney, Agent, or Firm* — David D. Brush; Westman, Champlin & Koehler, P.A.

(57) ABSTRACT

An electronic payment device intended to be integrated into an unattended electronic payment terminal. The electronic payment device includes at least one electronic card, a screen, a keyboard and a contactless payment module. The contactless payment module has at least one contactless antenna arranged on a plane, called antenna plane, raised by a first predetermined distance with respect to the plane of the keyboard and raised by a second predetermined distance (Continued)

with respect to the plane of the screen. The second predetermined distance is smaller than the first predetermined distance.

11 Claims, 7 Drawing Sheets

(56) References Cited

U.S. PATENT DOCUMENTS

| | | | | |
|---|---|---|---|---|
| 11,373,159 | B2* | 6/2022 | Nieuwborg | G06K 7/1417 |
| 2009/0170559 | A1* | 7/2009 | Phillips | H01Q 1/243 |
| | | | | 455/556.1 |
| 2014/0191034 | A1* | 7/2014 | Glanzer | G06F 1/1628 |
| | | | | 235/449 |
| 2017/0011385 | A1 | 1/2017 | Rotsaert | |
| 2017/0222683 | A1* | 8/2017 | Adelmann | H04M 1/185 |
| 2017/0357351 | A1 | 12/2017 | Paulsen et al. | |

FOREIGN PATENT DOCUMENTS

| | | | |
|---|---|---|---|
| KR | 2015004944 A | * | 1/2015 |
| WO | WO-2016190829 A1 | * | 12/2016 |
| WO | 2017009816 A1 | | 1/2017 |

OTHER PUBLICATIONS

KR 20150004944A mobile type credit card payment apparatus having multy function, 10 pages. (Year: 2024).*

JP 2011030299A Reader/Writer Device, and System and Method for Charging Battery, 7 pages. (Year: 2024).*

International Search Report dated Jun. 8, 2022 for corresponding International Application No. PCT/EP2022/056744, filed Mar. 15, 2022.

Written Opinion of the International Searching Authority dated Jun. 8, 2022 for corresponding International Application No. PCT/EP2022/056744, filed Mar. 15, 2022.

French Search Report and Written Opinion dated Nov. 24, 2021 for corresponding French Application No. 2102627, filed Mar. 16, 2021.

English translation of the Written Opinion of the International Searching Authority dated Jun. 8, 2022 for corresponding International Application No. PCT/EP2022/056744, filed Mar. 15, 2022.

* cited by examiner

2

10

10 Figure 2b
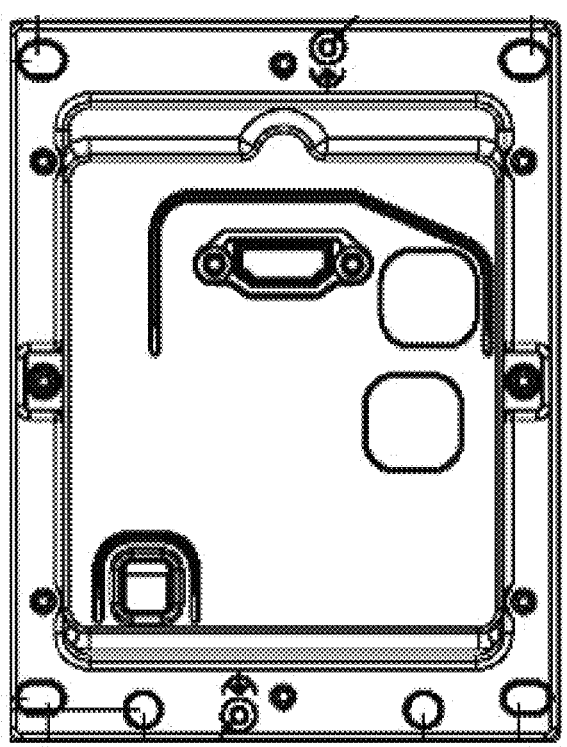
Figure 3a
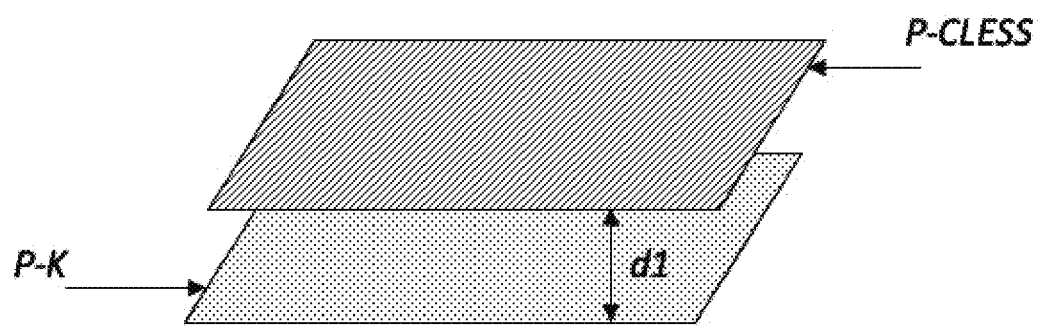

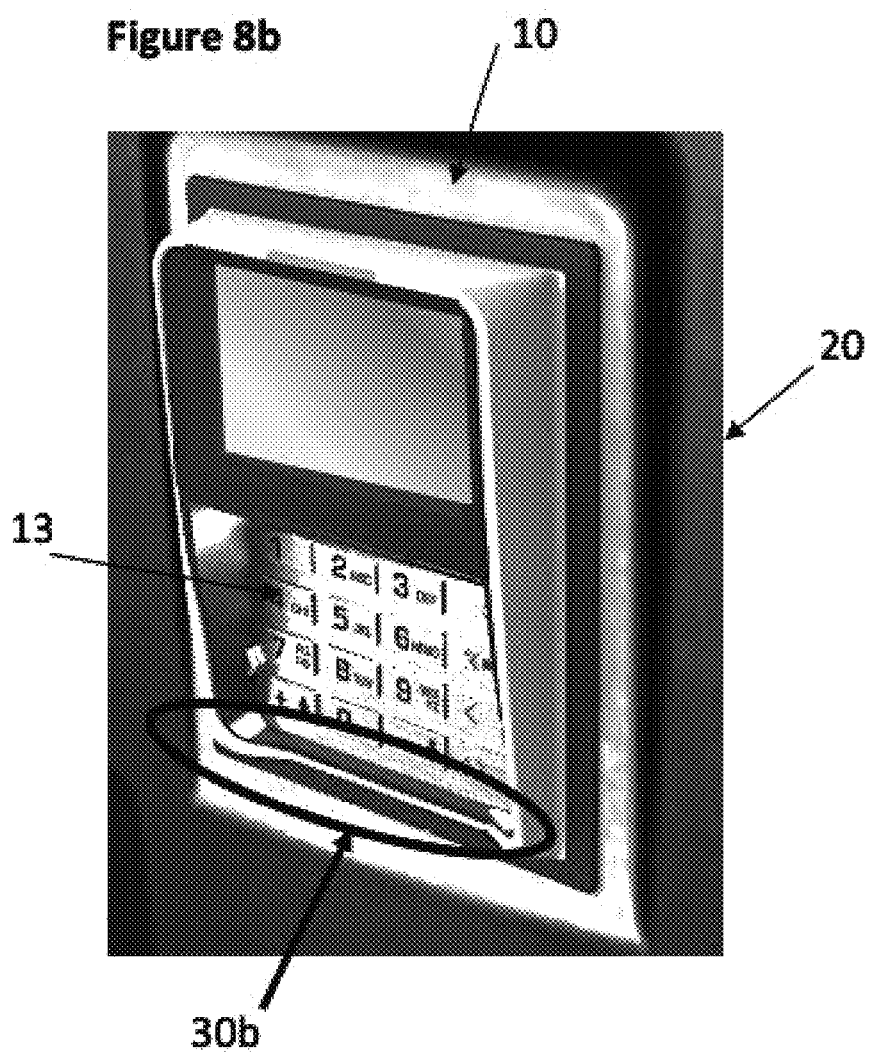

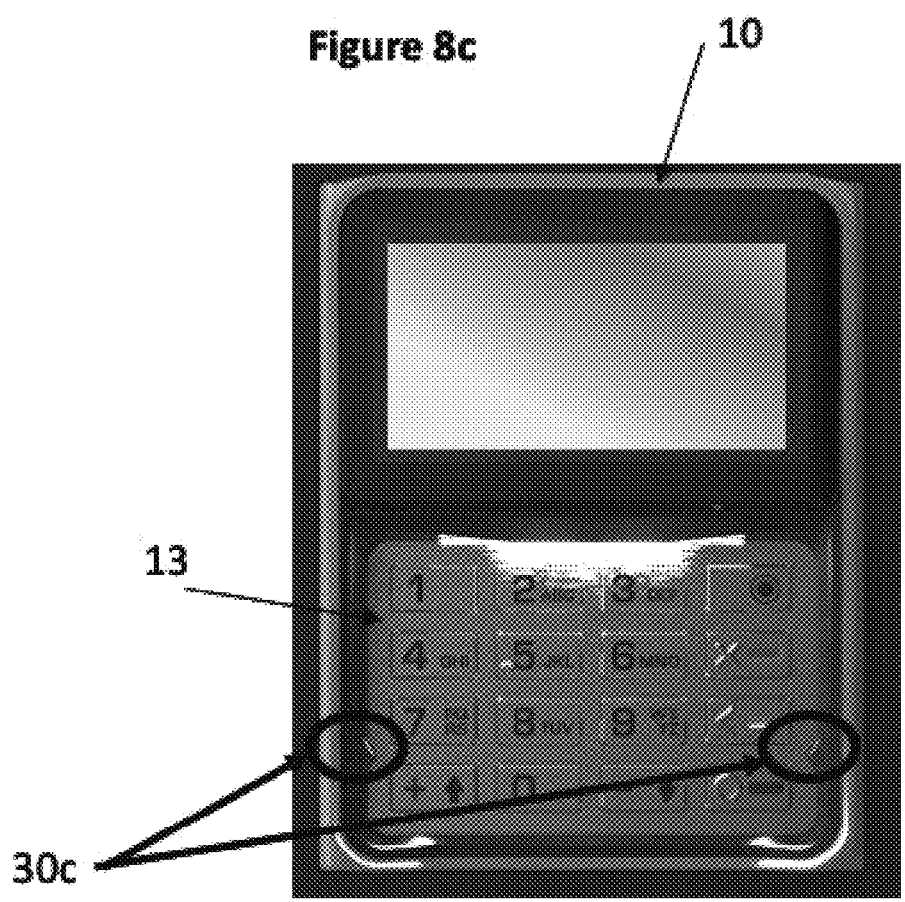

PAYMENT DEVICE INTEGRATED INTO AN UNATTENDED ELECTRONIC PAYMENT TERMINAL

CROSS-REFERENCE TO RELATED APPLICATIONS

This Application is a Section 371 National Stage Application of International Application No. PCT/EP2022/056744, filed Mar. 15, 2022, which is incorporated by reference in its entirety and published as WO 2022/194889 A1 on Sep. 22, 2022, not in English.

FIELD OF THE INVENTION

The invention relates to the field of so-called unattended payment terminals, like for example payment terminals for parking lots, parking spaces, for buying transport tickets or show tickets, ticket distributors, beverage or candy distributors, fuel distributors . . . referred to in the following description, for easier reading, as "unattended payment terminal" or "payment terminal".

PRIOR ART

Currently, such unattended payment terminals include at least two distinct devices, arranged for example next to one another or on top of one another in the front of the payment terminal, or of the parking kiosk, or of the distributor . . . . For example, as illustrated in FIG. 1, these two devices correspond on the one hand to a "remote keyboard" 1 ("Pinpad"), comprising a screen and a keyboard, and on the other hand to a contactless "target" 2 ("Contactless"), comprising a contactless antenna and an area displaying the contactless logo. These two devices are connected together in order to function as an electronic payment terminal.

However, this configuration with two separate devices has some drawbacks, in particular in terms of ergonomics for the user, bulk and security.

Indeed, in "attended" electronic payment terminals, for example in shops, the area intended to approach the card for contactless payment can be easily identified by the user because it is located on the electronic payment terminal itself (either on the screen, or remote on top of the electronic payment terminal). On the other hand, when this area is remote from the rest of the electronic payment terminal, like in an unattended payment terminal, and in particular remote from the screen displaying the instructions for payment (like for example the instruction to insert the card into the electronic payment terminal for contactless payment or the approach of the card for contactless payment), the user cannot easily identify it and waste time looking for it before being able to perform his payment.

In addition, the integration of two distinct devices in an unattended payment terminal is not optimum in terms of space, because this requires two distinct locations within the terminal, as well as two openings in the front of the unattended payment terminal.

This configuration also has drawbacks in terms of securing the connection(s) essential for communication between the two devices in order to perform transactions.

Hence, there is a need for a solution allowing addressing the problems of integrating a payment device with a contactless payment module in an unattended payment terminal, while limiting the cost impacts on the manufacture of unattended payment terminals and complying with the different security standards related to this integration and to contactless payment.

SUMMARY OF THE INVENTION

The proposed technique allows solving at least some of the problems of the prior art, by means of an electronic payment device intended to be integrated into an unattended electronic payment terminal, the electronic payment device comprising at least one electronic card, a screen and a keyboard. According to the present technique, the electronic payment device comprises a contactless payment module comprising at least one contactless antenna arranged in a plane, called antenna plane, raised by a first predetermined distance with respect to the plane of the keyboard and raised by a second predetermined distance with respect to the plane of the screen, the second predetermined distance being smaller than the first predetermined distance.

The proposed solution is based on a new and inventive approach to the integration of a contactless payment module, and more particularly of the contactless antenna, in a payment device itself intended to be integrated into an unattended payment terminal.

To do so, the antenna is arranged in a raised plane with respect to the plane of the metallic keyboard, the plane of the metallic keyboard being substantially identical to the metallic plane of the front of the unattended payment terminal, when the payment device is integrated vertically in the unattended payment terminal. Thus, the antenna is away from the metallic portions formed by the keyboard and the front of the unattended electronic payment terminal (the metal being selected for reasons related robustness and impact resistance), limiting the interferences generated by these metallic "front" portions.

In addition, the raised arrangement of the antenna also allows setting it away from the "rear" metallic portion of the electronic payment device, thereby limiting interferences due to any metallic portion located proximate to the antenna.

Finally, the antenna is also raised with respect to the plane of the screen, itself raised with respect to the plane of the metallic keyboard, for reasons related to visibility. In this manner, the raised arrangement of the antenna with respect to the screen brings it closer to the protective glass pane of the screen, the distance of which is optimised with respect to the front of the unattended payment terminal. Hence, the screen is set back inside the case, which allows reinforcing the security of the screen against vandalism acts.

Hence, the planes of the antenna, screen and keyboard are superposed and substantially parallel.

According to a particular aspect of the present technique, the contactless antenna is positioned above the screen and has a shape substantially identical to the shape of the screen and the contactless antenna has dimensions larger than those of the screen.

Thus, the antenna is positioned in the area above the screen and it is not only raised with respect to the plane of the screen but also larger than the screen, ensuring enough distance with respect to the screen in all directions (around and above the screen) so as to limit reciprocal interferences between the antenna and the screen. For example, the antenna is folded and shaped so as to replicate the rectangular shape of the screen, with dimensions larger than those of the screen and with a descending portion, along one side of the screen, for connection thereof to the electronic card.

According to a particular feature, the contactless antenna is positioned around an antenna support inside which the screen is embedded.

Thus, the raised arrangement of the antenna with respect to the screen is ensured by an antenna support, around which the antenna is positioned and inside which the screen is itself positioned. To do so, the dimensions of the antenna should therefore be larger than those of the screen, since they are larger than those of the support in which the screen is embedded. This technical solution allows ensuring its separation from the screen, in all directions, while providing support for the antenna.

For example, this support corresponds to a parallelepiped-shaped plastic case (more specifically in the form of a block) having a glass pane on one of its faces and an opening on the opposite face for the insertion of the screen (and the sealing gasket around the screen). The antenna conforms to the shape of the support at the upper portion (close to the glass pane) of the four other faces of the block. Thus, when the payment device is assembled, the glass pane of the case forming the antenna support is in a plane parallel to the plane of the screen and to the plane of the keyboard, the four faces around which the antenna is wound being perpendicular to these screen and keyboard planes.

For example, the contactless antenna is arranged perpendicularly to the antenna plane so as not to disturb viewing of the screen.

Thus, the antenna being arranged "around" the screen, although in a plane raised with respect to that of the screen, it is preferable to arrange it vertically, i.e. perpendicularly to the plane of the screen, so as to limit its influence and not impinge on the screen. Thus, this vertical positioning allows not trimming the size of the screen, also subject to compactness constraints to be complied with for the integration of the payment device in an unattended payment terminal.

This vertical positioning also allows adapting the antenna easily around a plastic support in the form of a block, for example in a notch provided on the "vertical" faces of the block with respect to the plane of the keyboard.

According to a particular aspect of the proposed technique, the electronic payment device is integrated into a case comprising a front portion and a rear portion, the front portion being made of a non-conductive material meeting predetermined robustness mechanical constraints.

Thus, interferences due to metallic portions proximate to the antenna are significantly limited by the use of a non-conductive material for the front portion of the case of the payment device, and by the raised arrangement of the antenna allowing setting it away from the front metallic portion corresponding to the front of the unattended payment terminal and from the rear metallic portion of the case. However, the selection of such a non-conductive material for the front portion is also governed by robustness mechanical constraints, the front portion being directly exposed to the risks of vandalism.

For example, the non-conductive material is fibreglass-reinforced Polycarbonate.

The selection of this material is the result of a tradeoff between resistance to attacks by vandalism, such as attacks by sharp objects (knives, scissors . . . ) or flame, and the manufacturing precision of the considered parts, and in particular of the front portion of the case of the electronic payment device, comprising in particular a rim over its periphery.

According to a particular feature, at least one portion of the contactless antenna connecting it to the electronic card of the electronic payment device is inserted into a sealing enclosure made of a non-conductive material.

According to this embodiment, a solution is proposed in order to overcome any problems of water infiltration that might arise due to the exposure of the antenna on the front face. To guarantee sealing at the location where the antenna penetrates the sealed area (electronic card), an overmoulding made of a plastic material is thus provided at the base of the antenna.

According to a particular aspect, the antenna support comprises a glass pane over a face opposite to the face formed by the screen embedded in the antenna support, and the volume between the glass pane and the screen is smaller than a predetermined volume, and a sealing gasket is positioned around the screen inside the antenna support to guard against condensation phenomena.

According to this embodiment, a solution is proposed in order to overcome any problems of condensation by reducing the air volume comprised between the lower portion of the glass pane and the upper portion of the screen and by providing for a sealing gasket around the screen. This air volume is specific to the display area.

Moreover, the midpoint of the contactless antenna is connected to the ground of the electronic card.

This feature allows taking account of ESD (ElectroStatic Discharge) discharge considerations in the configuration where the front portion of the case of the payment device is made of a non-conductive material. Indeed, in this case, the antenna is the first metallic portion through which the user "electrostatically" discharges himself by affixing his payment card (unlike configurations in which it is the smart card reader which allows providing an ESD discharge area). Hence, by connecting the midpoint of the antenna to the ground of the electronic card, damage of the contactless component by electrostatic discharges is avoided, by flowing the ESD discharge into the ground of the payment device.

According to a particular feature, the electronic payment device further comprises at least one means for detecting the installation of a spy device on the keyboard amongst:
  an outer backlighting device arranged above the keys of the keyboard;
  a cutout in the lower portion of the peripheral rim of the front portion of the case of the electronic payment device;
  at least one boss proximate to the keys of the keyboard.

Thus, at least one of these means allows detecting, visually (for example by a person in charge of occasional maintenance and monitoring of the unattended payment terminal) the installation of a spy keyboard, or fake keyboard or "skimmer" (a technique allowing recovering the confidential code on which it is entered, without the knowledge of the user who thinks he is entering his code directly on the keyboard of the payment terminal) over the keyboard of the payment device.

Indeed, the outer backlighting arranged above the keys is modified when a fake keyboard is stuck over the authentic keyboard of the payment device, and this modification can be detected by an informed person whose role is to detect a hacking attempt. Similarly, the smaller rim at the bottom of the keyboard, also facilitating access to the keys of the keyboard, is no longer visible if a fake keyboard is stuck on. Finally, one or more bosses provided between certain keys is (are) necessarily covered by a fake keyboard and the absence of this (these) boss(es) is easily detectable by an informed person whose role is to detect a hacking attempt.

LIST OF THE FIGURES

The proposed technique, as well as the different advantages it presents, will be more easily understood in light of the following description of two illustrative and non-limiting embodiments thereof, of their variants, and of the appended drawings wherein:

FIG. 2b illustrates a rear view of the example of an electronic payment device of FIG. 2a;

FIG. 3a illustrates a diagram showing the contactless antenna and keyboard planes in an electronic payment device according to an embodiment of the proposed technique;

FIG. 8b illustrates a second example of means for detecting the installation of a spy device on the keyboard of an electronic payment device according to an embodiment of the proposed technique;

FIG. 8c illustrates a third example of means for detecting the installation of a spy device on the keyboard of an electronic payment device according to an embodiment of the proposed technique.

DETAILED DESCRIPTION OF THE PROPOSED TECHNIQUE

The problem that the Inventors of the present application have encountered lies in the integration, within one single electronic payment device itself integrated into an unattended payment terminal, of the contactless payment function. A large number of constraints have then appeared, related on the one hand to the context of use of its unattended payment terminals and on the other hand to the operating and security requirements of the contactless payment function.

Thus, the Inventors have sought to solve the technical problem consisting in integrating a contactless solution into a metallic support (essential material to resist bad weather and comply with the mechanical constraints essential to resist vandalism to which unattended payment terminals are exposed) while remaining compatible with the contactless payment standards relating to the efficiency of the contactless antenna, with optimum ergonomics for the user, and with the security standards relating to electronic payment terminals. Other more specific constraints have also appeared during the development of each solution and are described hereinafter in more details.

Figure 1:
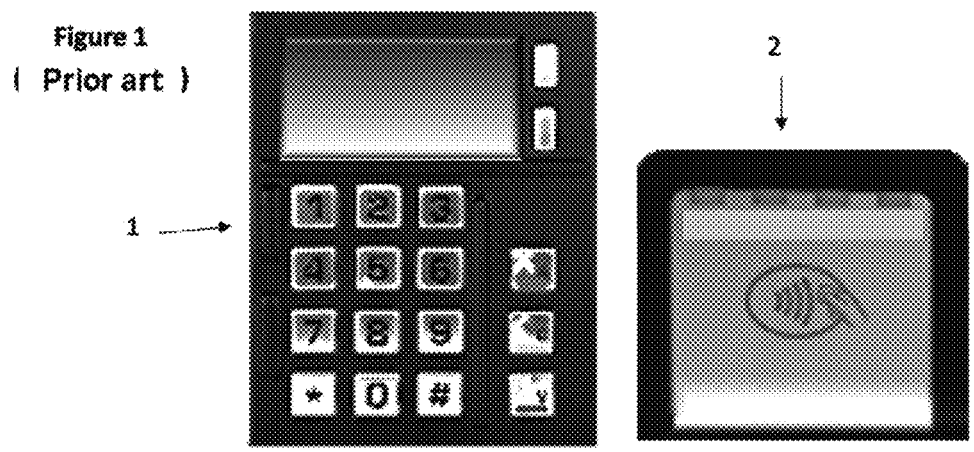
FIG. 1 illustrates an example of an electronic payment device according to the prior art.
Figure 2A:
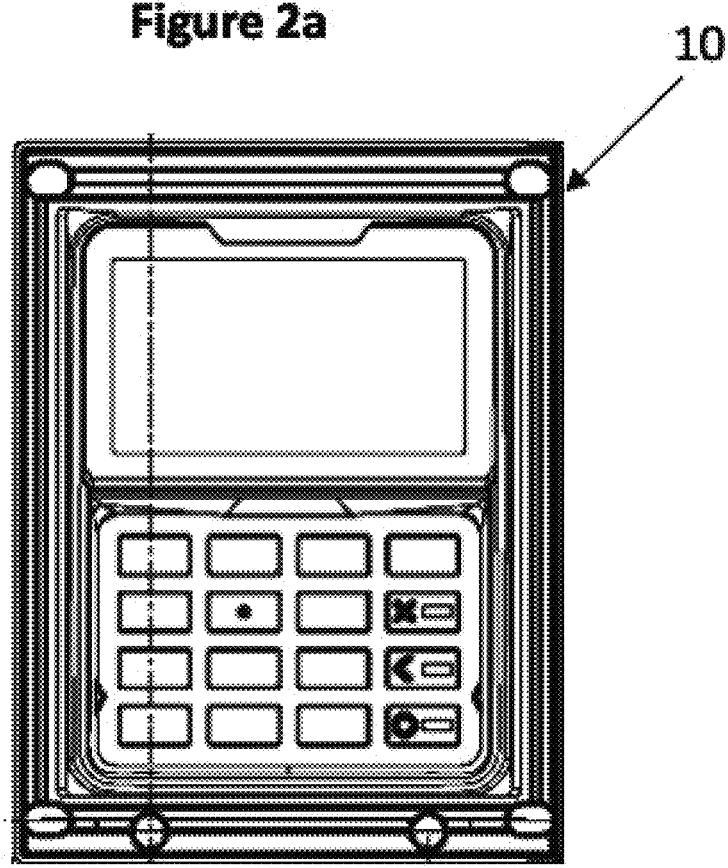
FIG. 2a illustrates a front view of an example of an electronic payment device according to an embodiment of the proposed technique.

Hence, the general principle of the invention consists in providing an electronic payment device in one single case 10 (an example of which is illustrated by FIGS. 2a and 2b, showing respectively a front view and a rear view), showing all of the required functionalities including contactless payment and intended to be integrated into an unattended payment terminal.

To do so, the Inventors have therefore first sought to set the contactless antenna (of the contactless payment module) as far away as possible from the metallic portions present in the electronic payment device itself as well as in the unattended payment terminal in which it is integrated. Hence, the contactless antenna should be set away on the one hand from the metallic keyboard and from the rear portion of the case of the electronic payment device and on the other hand from the front of the payment terminal.

According to the general principle, schematized in FIG. 3a, the plane of the contactless antenna P-CLESS is therefore raised with respect to the plane of the keyboard P-K of the payment device, by a first distance d1 selected so as to limit interferences between the metallic keyboard and the contactless antenna. For example, this distance d1 is comprised between nine and twenty millimetres, preferably close to nine millimetres, a distance resulting from a tradeoff between optimum performances of the antenna and the compactness of the payment device at the antenna and the screen.

However, this raised arrangement poses problems related to the selection of the location of the antenna within the payment device.

Indeed, this raised arrangement supposes a difference in height between the keyboard and the contactless antenna, these two elements having however to be accessible to the user, to enter a code or to affix a contactless payment card proximate to the antenna. Thus, this raised arrangement generates a significant increase in the thickness of the payment device, because of this difference in height between the keyboard and the contactless antenna.

Hence, the Inventors have sought to position the antenna so as to minimise the impact of this raised arrangement. Thus, they have first tested the positioning of the antenna around the payment device, in a rim surrounding it, also providing for a transverse rim at the middle of the payment device to position the contactless logo (in order to comply with standards governing contactless payment). This configuration allows setting the contactless antenna away from the keyboard, as well as from the front of the unattended payment terminal, because the antenna is positioned in a raised plane with respect to the plane of the keyboard (substantially identical to the plane of the front of the payment terminal). However, this configuration has at least the following drawbacks:

the rim surrounding the payment device substantially degrades accessibility to the keys of the keyboard, primarily those located at the bottom of the keyboard;
this rim also significantly degrades the visibility/readability on the screen;

when the payment device is integrated horizontally or inclined with respect to the front of the payment terminal (and not vertically, in a plane substantially identical to that of the front), the recesses created at the screen and the keyboard by the peripheral rims and the rim at the middle supporting the contactless logo form some kind of "basins" in which water (from rain for example) stagnates and is likely to degrade the product, as well as limiting or preventing readability of the screen in particular.

Hence, the Inventors have sought to solve these problems by positioning the antenna elsewhere in the payment device and more particularly by selecting a configuration "around" the screen. It should be noted that this choice goes against the evolutions of current architecture of fixed or mobile electronic payment terminals because this antenna configuration around the screen is less and less used nowadays for reasons related to compactness and reciprocal interferences between the contactless antenna and the screen, making the application of new contactless payment standards difficult.

However, in the context of the present technique, the Inventors have succeeded in finding a solution to these problems of reciprocal interferences between the contactless antenna and the screen on the one hand by raising the antenna by a second distance d2 with respect to the screen (itself slightly raised with respect to the keyboard for better visibility) and secondly by setting the antenna laterally away from the screen.

Figure 3B:
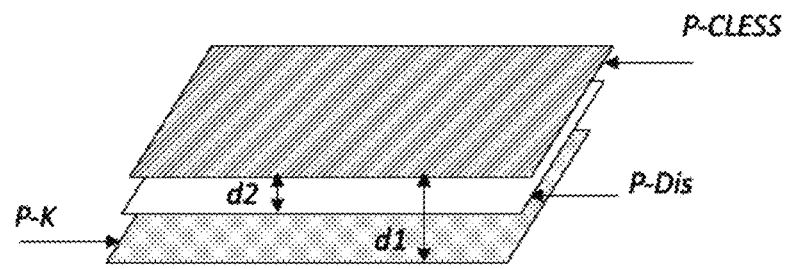
FIG. 3b illustrates a diagram showing the contactless antenna, keyboard and screen planes in an electronic payment device according to an embodiment of the proposed technique.

This configuration is schematized in FIG. 3b, on which are visible the three superimposed planes of the keyboard P-K, the screen P-Dis and the contactless antenna P-CLESS.

Figure 3C:
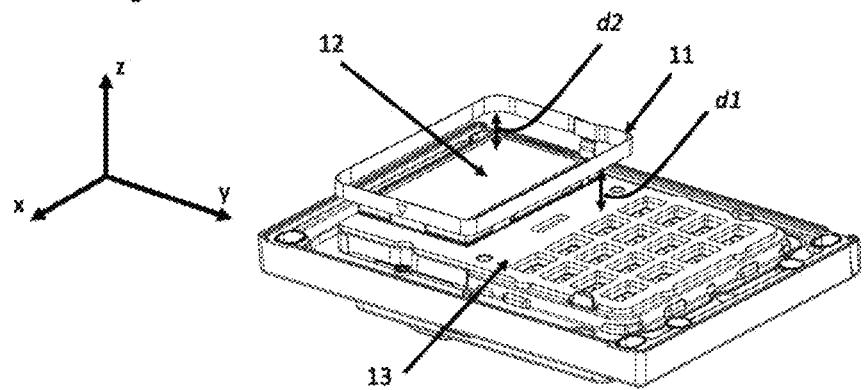
FIG. 3c illustrates a perspective view of a portion of an electronic payment device according to an embodiment of the proposed technique.

Moreover, according to an embodiment of the present technique, the contactless antenna has a shape substantially identical to that of the screen, i.e. most generally a rectangle, with dimensions larger than those of the screen, so as to increase the "lateral" separating distance with respect to the screen. FIG. 3c illustrates a portion of some elements of a payment device according to an embodiment of the present technique, and in particular the contactless antenna 11 with a rectangular shape, raised by a distance d1 with respect to the keyboard 13 and a distance d2 with respect to the screen 12.

In this FIG. 3c, the contactless antenna 11 is positioned vertically (direction z in the orthonormal reference frame) with respect to the (x-y) planes of the screen and of the keyboard in particular (i.e. with respect to the general plane of the payment device), so as to limit gripping thereof on the screen, which can thus be designed with a maximum size without any constraints related to the positioning of the antenna.

This vertical positioning of the antenna is made possible by the use of an antenna support, made of a non-conductive material, around which the antenna is applied.

Figure 4:
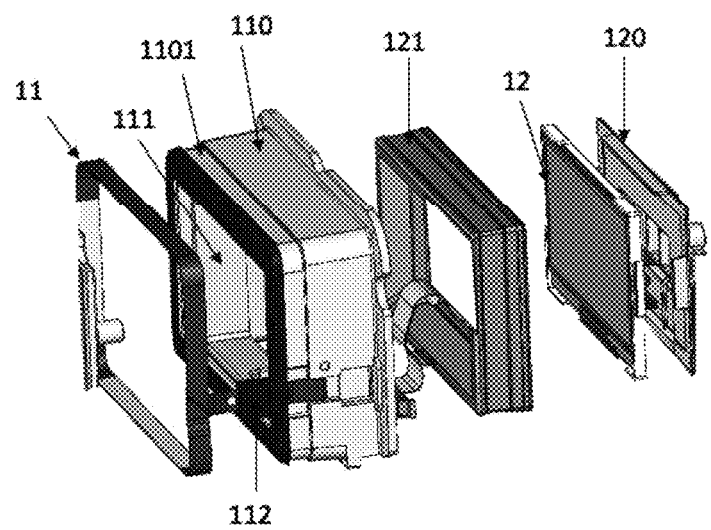
FIG. 4 illustrates an exploded view of a portion of an electronic payment device according to an embodiment of the proposed technique.

In particular, FIG. 4 illustrates this antenna support, in an exploded view of a portion of the payment device allowing in particular to visualising the positioning of the different elements with respect to each other. Thus, when the payment device is assembled, the screen 12 is positioned on a screen support 120 and surrounded by a screen gasket 121 allowing ensuring sealing thereof, when it is embedded in the antenna support 110. Moreover, the accurate selection of the volume of the space created between the screen and the glass, i.e. a limited volume while ensuring the necessary distance between the antenna and the screen, also allows overcoming any problems of condensation. In addition, the contactless antenna 11 is applied around its support 110, for example at some kind of notch 1101 provided on the upper periphery of the support 110. To do so, the dimensions of the antenna 11 are adapted so that it is held on its support when it is inserted into this notch 1101. Thus, the contactless antenna may be supplied flat with the other components of the payment device, so as to be shaped at the time of integration thereof. It is then folded to match with the shape and dimensions of the notch 1101 intended to accommodate it in the antenna support 110.

Moreover, one face of the support 110 consists of a glass pane 111 corresponding to the glass pane through which the contactless payment logo is visible from the screen 12. Hence, this glass pane 111 corresponds to the glass pane on which the user can affix his bank card for contactless payment. Finally, a sealing enclosure 112, described in more detail hereinafter with respect to FIG. 5, allows mitigating any risks of water infiltration and condensation that might reach the screen or the electronic card to which the antenna is connected.

All these elements illustrated in FIG. 4 are made of a non-conductive material, for example of the polycarbonate or elastomer type. In this manner, the assembly of these elements does not include any metallic material which could interfere with the contactless antenna.

Figure 5:
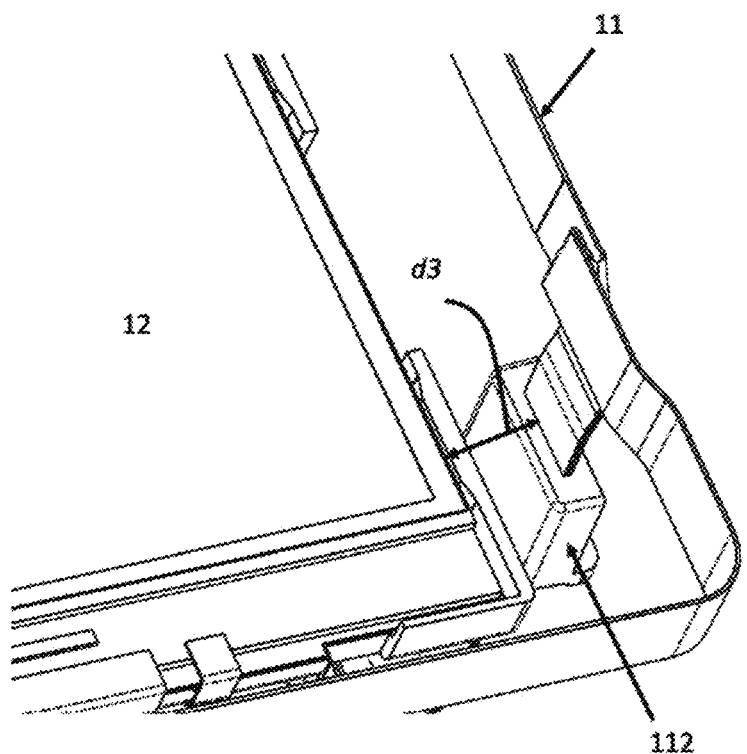
FIG. 5 illustrates a sealing enclosure at the base of the contactless antenna in an electronic payment device according to an embodiment of the proposed technique.

As indicated before, the contactless antenna is therefore positioned on an antenna P-CLESS plane raised by a distance d2 with respect to the screen P-Dis plane, which generates a distance d'2 close to d2 between the screen 12 and the glass pane 111. Hence, this distance d'2 corresponds substantially to the height of the antenna support 110, because the glass pane 111 corresponds to the upper face of the antenna support 110 and the opposite lower face, corresponds to the screen 12 which is embedded therein. This configuration has a considerable advantage in terms of robustness of the screen because the latter is located away from the front face of the payment terminal and therefore protected from possible acts of vandalism. On the other hand, this distance d'2 between the glass pane and the screen also has the following drawbacks, which the Inventors have been able to overcome:

a potential problem of condensation and water infiltration, because the antenna is close to the glass pane and the condensation inside the case of the payment device might run along the antenna down to the screen, or the electronic card. A solution to this problem lies in the implementation of a sealing enclosure 112 at the base of the antenna, at the portion of the antenna that connects it to the electronic card. For example, this sealing enclosure 112 corresponds to an overmoulding, in a non-conductive material, at the base of the antenna to guarantee sealing thereof. More particularly, FIG. 5 illustrates this sealing enclosure 112 at the base of the antenna, as well as the lateral distance d3 between the contactless antenna 11 and the screen 12, allowing setting the contactless antenna 11 further away from the screen 12 and therefore limiting reciprocal interferences. Hence, this sealing enclosure 112 comprises an opening in which the contactless antenna is inserted, until connection thereof on the electronic card. Hence, in this embodiment, it is the "vertical" extension of the antenna which is protected by this sealing enclosure 112. Indeed, the keyboard 13 forms a sealed area protected by a membrane from the outside. The contactless antenna 11 should be connected in this sealed area and the sealing enclosure 112 allows avoiding the passage of the antenna through this sealed area degrading its performances.

a problem of distance between the display of the contactless logo on the screen and the glass pane on which the user affixes his card, this distance being governed by the standards of contactless payment defining in particular constraints of positioning the contactless logo with respect to the antenna. However, in the configuration described herein, the logo displayed on the screen is away from the contactless antenna, but its visibility through the glass pane allows using the outer surface of the glass pane as a measurement reference and thus complying with the standard.

Figure 6:
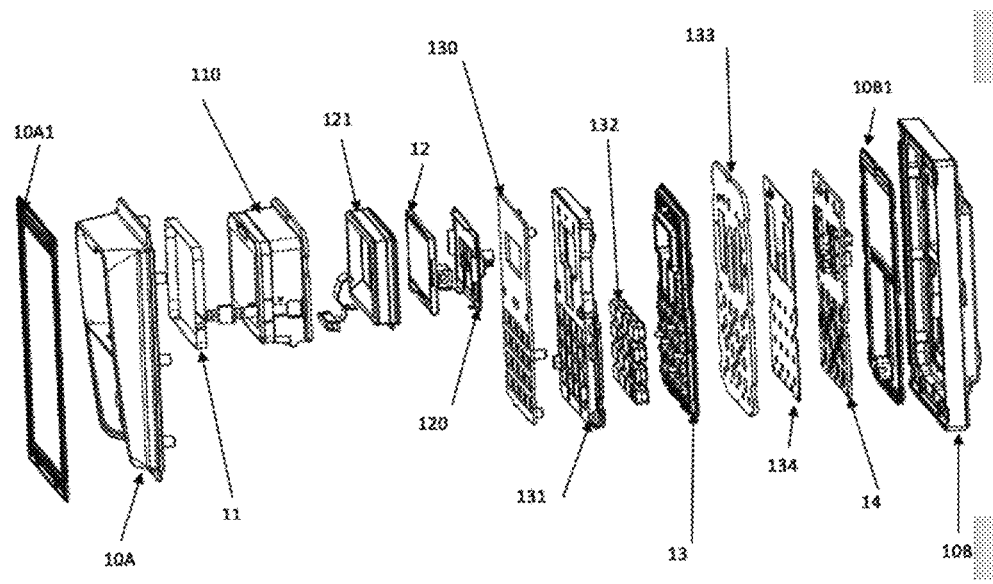
FIG. 6 illustrates an exploded view of the main elements composing the electronic payment device according to an embodiment of the proposed technique.

FIG. 6 illustrates the main elements composing the payment device according to the present technique, in an exploded view allowing in particular visualising the positioning of the different elements with respect to each other. Thus, one could notice that the contactless antenna 11 is protected by a front cover 10A made of a non-conductive material allowing not altering its emission performances, and by a front sealing gasket 10A1 (for example made of elastomer). Moreover, it should also be noted that the contactless antenna 11 is away from the rear metallic portions of the case of the payment device, and in particular from the front face 130 made of stainless steel of the keyboard 13 (for example made of silicone), from the front reinforcement plate 131 of the keyboard 13, the metallic keys 132 of the keyboard 13, the rear reinforcement plate 133 of the keyboard 13 and the rear cover 10B itself. It should be herein repeated that the case is metallic to offer optimum resistance to impacts, and that this metallic presence is possible thanks to the distance provided for the contactless antenna. Hence, the material of the rear case 10B is selected as being the most resistant possible with regards to the cost that could be supported.

For example, the network of security domes 134 (intended to protect the keyboard against intrusion attempts intended for example to insert spy devices into the keyboard) is a flexible (or flex) part made of polyimide, and the rear sealing gasket 10131, intended to be inserted into the rear cover 10B, is for example made of elastomer like the front sealing gasket 10A1.

The payment device according to the present technique should also comply with the constraints of integration into a payment terminal specified in particular by the "EVA" association (standing for "European Vending & coffee service Association") or the constraints of other formats historically used by other manufacturers. In particular, the constraints of robustness to vandalism are very strict and the Inventors have faced the need to find a non-conductive material solid enough to replace the metal for the front case 10A of the payment device.

In order to address in particular to the IK10 resistance index constraints, several plastic materials have been studied, like the "Thermosetting" family, which are not suitable due to the lack of finesse in making of the parts and the integration constraints required, and the "Thermoplastic" family.

Several thermoplastic materials have been studied, like Polycarbonate, Polycarbonate with glass fibres (PC GF) and Polycarbonate/Acrylonitrile Butadiene Styrene (PC/ABS). Polycarbonate with glass fibres (PC GF) has proved to be the most resistant to attacks by sharp objects (knives or scissors) but also the most sensitive to flame. Polyurethane resins of different hardnesses have also been studied, but their fragility to some vandalism attacks has not allowed validating their use. Hence, the selected material results from a tradeoff between robustness and manufacturing constraints.

Figure 7:
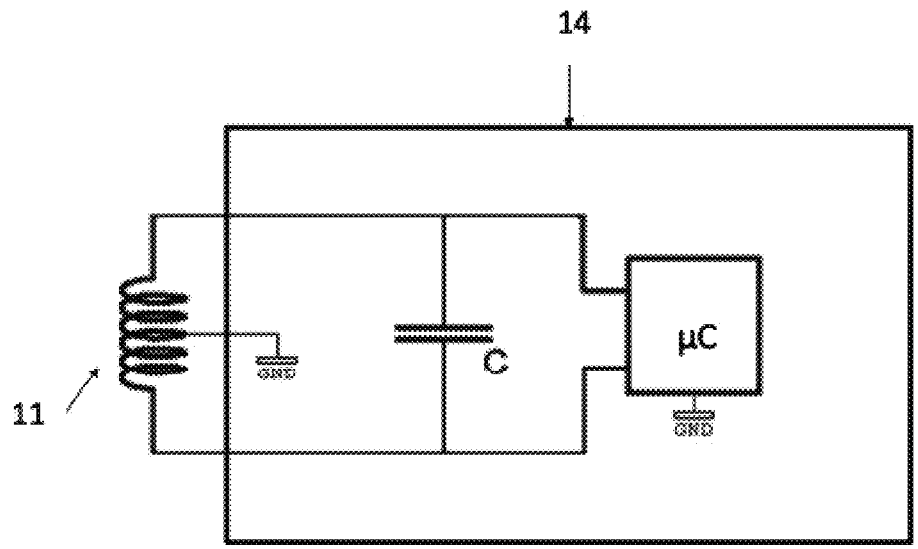
FIG. 7 is a diagram illustrating the grounding of the midpoint of the contactless antenna according to an embodiment of the proposed technique.

Moreover, electrostatic discharge (ESD) considerations also had to be taken into account, to the extent that the front portion of the case of the payment device is made of a non-conductive material. Indeed, in the present solution, the first metallic portion approached by the user when he affixes his card at the time of contactless payment, is the contactless antenna located proximate to the glass pane. Hence, the contactless antenna, and more broadly the contactless payment module, is the first area of the payment device in which the user discharges himself (like the card reader during a payment with card insertion, this reader including metallic portions). Yet, multiple and repeated electrostatic discharges are likely to seriously damage the contactless payment module and the Inventors have implemented a solution in order to avoid this drawback: the midpoint of the contactless antenna is connected to the ground of the electronic card of the payment device, for example according to the diagram illustrated in FIG. 7.

Moreover, the payment device of this technique also addresses the constraints of fight against fraud and in particular the installation of a spy device on the keyboard.

Figure 8A:
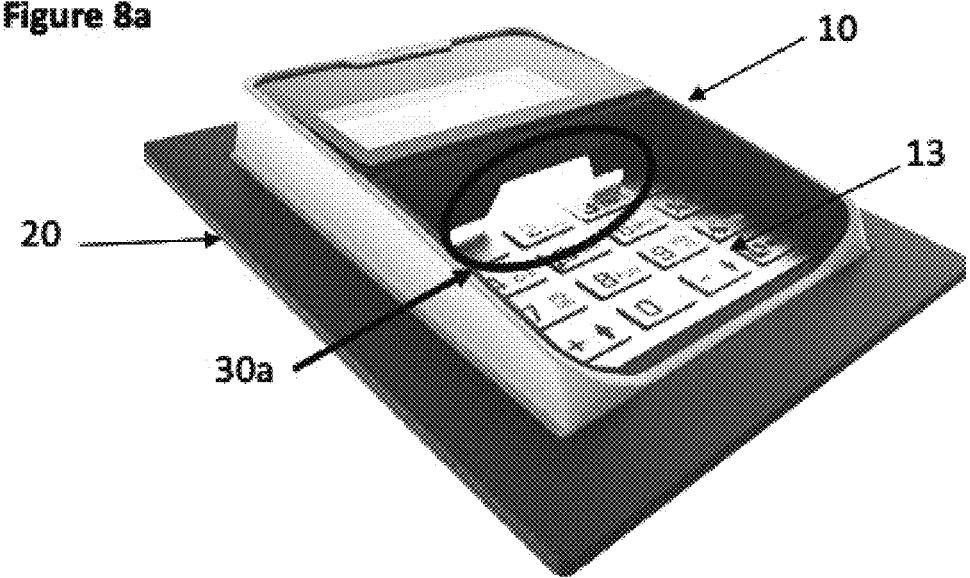
FIG. 8a illustrates a first example of means for detecting the installation of a spy device on the keyboard of an electronic payment device according to an embodiment of the proposed technique.

To do so, at least one of the following three techniques is implemented, as illustrated respectively in FIGS. 8a to 8c, enabling a person in charge of occasional maintenance and monitoring (for example once a day) of the payment terminal 20 to detect such a spy device, like for example a fake keyboard:

an outer backlighting module 30a located above the keys of the keyboard 13. Thus, if a fake keyboard is glued over the keyboard 13, the fake keyboard modifies and in particular limits the lighting on the top of the keyboard, which can be easily detected by simple observation of the payment terminal;

a rim 30b forming part of the belt on the front face of the payment device and having a cutout at the bottom of the keys of the keyboard 13, also facilitating access to the keys. Thus, if a fake keyboard is glued over the keyboard 13, the fake keyboard is flush with this edge 30b, which can be easily detected by simple observation of the payment terminal;

the addition of at least one boss 30c on the keyboard 13, for example two triangles in relief located on either side of the keys of the keyboard 13. If a fake keyboard is glued over the keyboard 13, this fake keyboard masks these bosses, which can be easily detected by simple observation of the payment terminal.

Finally, the payment device according to the present solution comprises, in a known manner and not described herein, several security loops and several opening detection systems, located at different sensitive elements like for example the rear portion of the case, the electronic card, the glass pane, the keyboard . . . . The contactless payment module being also considered as a sensitive element, its positioning at the front of the payment device also allows protecting it from possible attacks from the rear of the payment device. In particular, this allows overcoming the absence of a so-called "commissioning" solution intended to detect any attempt to pull off the payment device from the payment terminal in which it is integrated, a solution that has become non-mandatory.

The previously-described features allow addressing the technical problem of providing an electronic payment device in one single case, having all of the required functionalities including contactless payment and intended to be integrated into an unattended payment terminal. Thus, the positioning of the contactless antenna allows meeting the required operational conditions, in terms of emission performance, by limiting interferences with the essential metallic portions of the case of the payment device and of the unattended payment terminal itself, as well as limiting reciprocal interferences with the screen, while ensuring optimum visibility of the screen, optimum robustness to bad weather and acts of vandalism and electrostatic discharge with no impact on the integrity of the contactless payment module. Solutions for resisting hacking attempts are also implemented.

The invention claimed is:

1. An electronic payment device intended to be integrated into an unattended electronic payment terminal, said electronic payment device comprising:
- a screen;
- a metallic keyboard; and
- a contactless payment module comprising at least one contactless antenna arranged on a plane, called an antenna plane, raised by a first predetermined distance with respect to a plane of said keyboard and raised by a second predetermined distance with respect to a plane of said screen, said second predetermined distance being smaller than said first predetermined distance.

2. The electronic payment device according to claim 1, wherein said contactless antenna is positioned above said screen and has a shape substantially identical to a shape of said screen and said contactless antenna has dimensions larger than those of said screen.

3. The electronic payment device according to claim 1, wherein said contactless antenna is positioned around an antenna support, and wherein the screen is embedded inside the antenna support.

4. The electronic payment device according to claim 1, wherein said contactless antenna is arranged perpendicular to said antenna plane so as not to disturb viewing of said screen.

5. The electronic payment device according to claim 1, wherein the electronic payment device is integrated into a case comprising a front portion and a rear portion, said front portion being made of a non-conductive material meeting predetermined robustness mechanical constraints.

6. The electronic payment device according to claim 5, wherein said non-conductive material comprises fibreglass-reinforced polycarbonate.

7. The electronic payment device according to claim 1, wherein the electronic payment device further comprises at least one electronic card and wherein at least one portion of said contactless antenna connects the contactless antenna to said at least one electronic card and the at least one portion is inserted into a sealing enclosure made of a non-conductive material.

8. The electronic payment device according to claim 3, wherein said antenna support comprises a glass pane on a face opposite to a face formed by said screen embedded in said antenna support, and wherein a volume between said glass pane and said screen is smaller than a predetermined volume, and wherein a sealing gasket is positioned around said screen inside said antenna support to guard against condensation phenomena.

9. The electronic payment device according to claim 1, wherein the electronic payment device further comprises at least one electronic card and wherein a midpoint of said contactless antenna is connected to a ground of said at least one electronic card.

10. The electronic payment device according to claim 5, wherein the electronic payment device further comprises at least one element for detecting installation of a spy device on said keyboard amongst:
- an outer backlighting device arranged above keys of said keyboard;
- a cutout in a lower portion of a peripheral rim of the front portion of the case of said electronic payment device;
- at least one boss proximate to the keys of said keyboard.

11. The electronic payment device according to claim 1, wherein the contactless antenna does not overlay the metallic keyboard.

* * * * *